June 2, 1970   J. A. HOWARD   3,514,960
METHOD OF, AND MEANS FOR REDUCING THE TRACTIVE EFFORT ON AN
AGRICULTURAL TOOL
Filed March 24, 1967   2 Sheets-Sheet 1

INVENTOR:-
JOHN ARTHUR HOWARD

INVENTOR:-
JOHN ARTHUR HOWARD

United States Patent Office 3,514,960
Patented June 2, 1970

3,514,960
METHOD OF, AND MEANS FOR REDUCING THE TRACTIVE EFFORT ON AN AGRICULTURAL TOOL
John Arthur Howard, West Horndon, England, assignor to Rotary Hoes Limited, West Horndon, Essex, England
Filed Mar. 24, 1967, Ser. No. 625,864
Int. Cl. F16l *1/100;* A01b *35/00*
U.S. Cl. 61—72.6                         6 Claims

ABSTRACT OF THE DISCLOSURE

An earth-working tool is supported from a sledge and oscillated backwards and forwards so to be tilted for easing its passage through the ground.

---

The invention relates to a method of, and means for reducing the effort required for a tractor to draw an agricultural tool (e.g., a mole plough) operatively through the ground whereby to enable the operation to be carried out with less power than has hitherto been necessary, for example, for enabling the operation to be performed with a two-wheel drive tractor provided with rubber tyres instead of with a larger, crawler-type tractor.

The method of the invention includes tiltingly oscillating the tool in a vertical plane containing the line of travel so as to create clearance in the earth above and below it, and thereby reduce the frictional drag on the tool. This method can be applied whether the tool is mounted on an apparatus to be towed by the tractor, or on the tractor itself.

Means, according to the invention, for enabling this method to be performed, includes a holder, for the tool, which is driven to oscillate in the direction of travel whereby sympathetically tiltingly to oscillate the tool. Preferably the holder is supported pendulum-like and carries the tool at its foot.

According to a feature of the invention the tool is mounted on apparatus adapted to be towed by a tractor, and the power for oscillating the tool holder is derived from the power take-off shaft of the tractor.

In such a case, and according to a further feature, the tool holder is elongated and is pivotally supported pendulously at its top from a frame member and carries the tool at its foot, and the tool holder is acted upon in an intermediate position by a power-operated means for applying the oscillations.

Such power-operated means according to another feature, includes a connecting rod extending between the tool holder and the sheave of a driven eccentric supported from the frame member. Preferably the eccentric is driven from the power take-off shaft of a towing tractor, and the drive to the eccentric is through a speed-increasing gearing.

According to a still further feature the tool holder is mounted on a ground-engageable sledge adapted to be connected to the tractor for being towed.

In such a case, and according to yet another feature, the sledge is provided with a pair of aligned ground-engageable wheels of which the common axis can be moved about a common pivotal connection to the sledge whereby the wheels can be depressed for raising the sledge clear of the ground.

According to a still further feature, and in the case where the tool holder is pivotally supported from a frame member mounted on a ground-engageable sledge, the said frame member is a carriage which is vertically adjustable in guides mounted on the said sledge.

In such a case, and according to another feature, the guides are pivotally supported at the bottom from the sledge on an axis transverse to the latter, and are interconnected, remotely from their pivotal support, with the sledge through means by which the guides are adapted to be orientated to a desired angular position.

The invention is exemplified by the accompanying drawings, in which.

Figure 1:
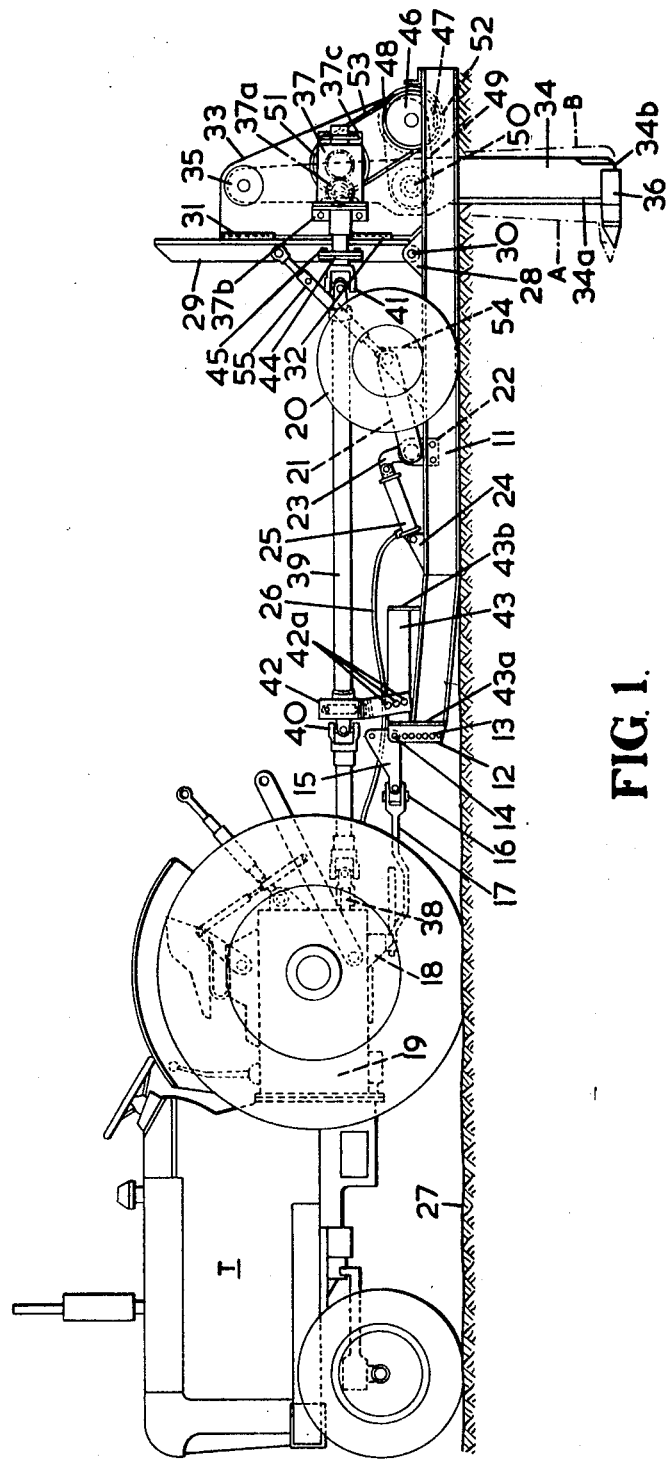
FIG. 1 is a side elevation showing one form of the tool-supporting means equipped with a mole plough and connected to a tractor.

FIG. 1 shows a towing tractor, indicated generally at T, and the tool-supporting means. The latter includes a ground-engageable sledge 11 which, at the front, has a vertical flange 12 provided with alternative pick-up points 13 for selective connection by a bolt 14 to a hitch member 15 which is universally jointed at 16 to a tow-bar 17 made fast in a bracket 18 secured to the underside of the tractor gear casing 19.

The sledge is provided with a pair of ground-engageable wheels 20 journalled on interconnected crank-arms 21 pivotally supported from transversely aligned brackets 22 fast with the longitudinal side members of the sledge, and the crank-arms 21 are fast with a third arm 23 between which, and a bracket 24 on the sledge, is connected a hydraulic ram 25 to be supplied by a pipe 26 from a pump (not shown) of the tractor. By extending the ram the wheels 20 are depressed clockwise about the pivotal support in brackets 22 so as to raise the sledge above ground level, which latter in indicated at 27.

At each side of the sledge, adjacent the rear, is a bracket 28, and between these brackets the bottom of an upright frame 29 is pivoted at 30. This frame is provided adjacent each side with a pair of aligned vertical guides 31, 32 for a carriage 33 so that the latter can be adjusted vertically of the frame and be locked in position by means not shown.

The top of an elongated tool holder 34 is pivotally supported at 35 adjacent the top of carriage 33, and it is shown carrying a mole plough 36 at its foot. Also supported from the carriage is a casing 37 containing variable speed gearing 37a which is driven from the tractor power take-off shaft 38 through a drive shaft 39 with universal joints 40 and 41 at its ends. Casing 37 is supported from carriage 33 by adjustable mountings 37b and 37c. The front of the shaft is supported in a bracket 42 pivotally mounted by one of three alternative attachment points 42a between side members 43 of the sledge, and the rear of the shaft is supported by bolting a flange 44 of the universal joint 41 to a flange 45 fast with the input shaft of the gearing 37. Side members 43 are supported by front and rear transverse members 43a and 43b of the sledge.

Also mounted on the carriage 33 is an eccentric 46 which is statically balanced by a weight shown at 47, and operates in a sheave 48 fast with one end of a connecting rod 49 having its other end journalled at 50 to the tool holder 34. An output V-pulley 51 of the gearing 37 drives a V-pulley 52, which is fast with the eccentric, through a V-belt 53 at unit ratio. The gearing 37 is a speed-increasing one, and it will be seen that the eccentric and connecting rod will oscillate the tool holder about its pivot 35 between the limits indicated at A and B, but at a greater speed than that of progression of the machine.

The tool holder and mole plough are shown in full lines in their median positions. By thus oscillating the tool holder the mole plough becomes uptilted at the front during the forward portion of the oscillation, and vice versa, cyclically so as to move the earth above and below it for reducing the frictional drag. The amplitude of oscillation of the mole plough can be of the order of 5 centimetres.

The tool holder is flat with a leading cutting edge 34a and the mole plough 36 is preferably made as a separate item and detachably secured to it. The flatness of the tool holder ensures that only a narrow slit, which can afterwards be closed, is formed in the ground while the mole plough forms a channel below ground level. It is essential for the rear edge of the tool holder to extend behind the mole plough, to just below its centre line, as indicated at 34b in order to keep the slit open during the oscillating action, and the mole plough should itself be solid.

By adjusting the carriage 33 vertically along the frame 29 the depth of operation of the mole plough can be adjusted.

Remotely from its pivot 30, frame 29 is connected to a pair of brackets 54 respectively fast with the longitudinal side members of the sledge by a pair of adjustable linkage arms 55, one only of which is shown. By adjusting the length of the arms 55 the frame 29, together with the carriage 33 and the parts attached thereto, including the tool holder 34, can be tilted for varying the attitude of the mole plough relatively to the horizontal. In this way it is possible when the mole plough is set to decline forwardly to give an upward movement to the soil to produce a "bursting out" effect.

Figure 2:
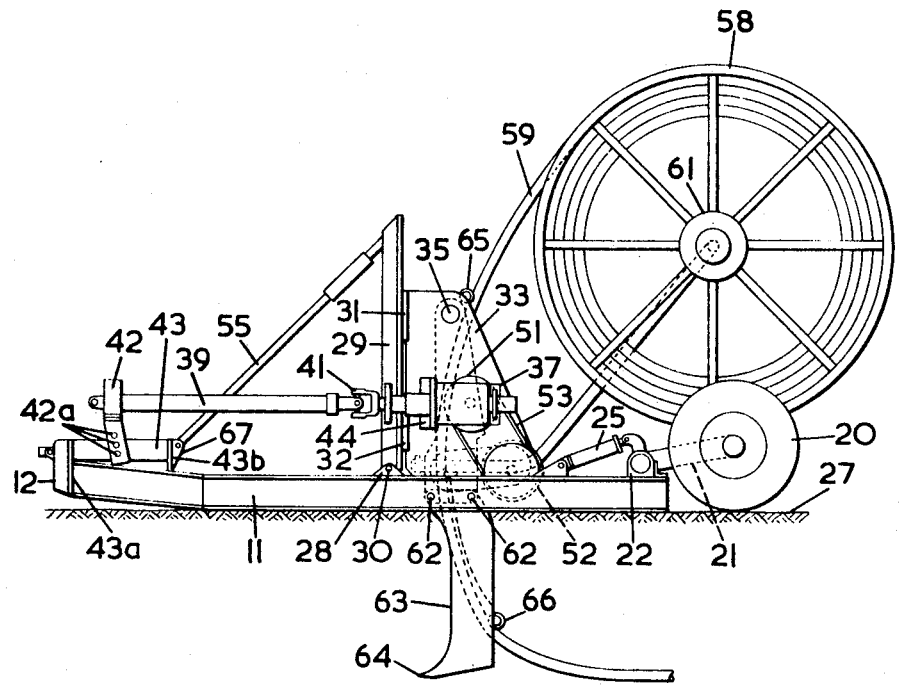
FIG. 2 is a side elevation of the tool-supporting means additionally equipped with means for laying a length of flexible hose in the channel formed by the mole plough.

Referring now to FIG. 2, the sledge 11 is equipped near the rear with a fixed arm 57 the top of which supports a transverse horizontal shaft on which a storage drum 58 for a length of flexible hose 59 or cable is journalled at 60 and retained by a cap 61. In order to support the weight of the storage drum when loaded, the transportation wheels 20 and their associated mechanism are arranged at the rear of the sledge for the wheels to be under the drum.

The tool holder 34 is shorter than the one in FIG. 1, and it detachably supports at 62 a flat earth working tool 63. The latter is of a thickness at least equal to the diameter of hose 59, and it has a sharpened leading edge terminating at the bottom with a toe 64. Fair lead pulleys 65 and 66 respectively on the carriage and the back of tool 63 guide the hose from the drum to the laying position beneath the ground.

By arranging the drum in the position shown the carriage 29 is shown as having been brought nearer to the front of the sledge, and the lower ends of the support arms 55 are connected to respective brackets 67 secured to transverse frame member 43b instead of to brackets on the longitudinal side members of the sledge as in FIG. 1.

Figure 3:
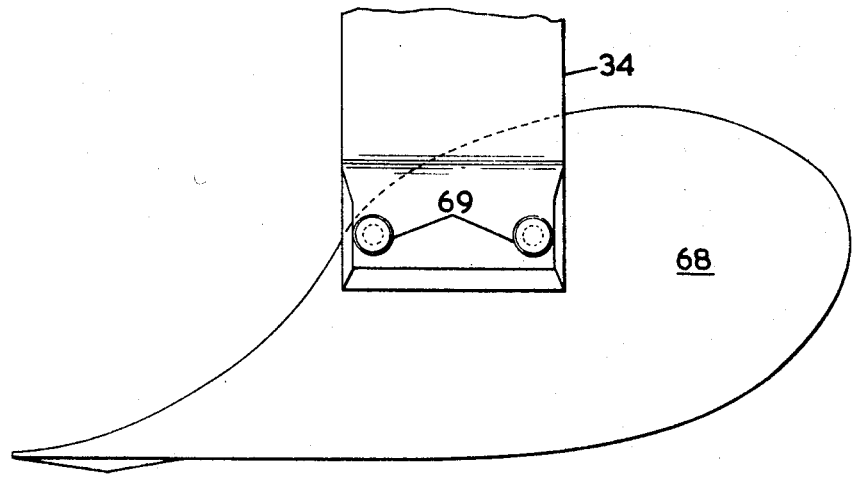
FIG. 3 is a view of the tool-supporting means shown in FIG. 1, but equipped with a scroll plough.

Referring now to FIG. 3 it will be seen that the tool holder 34 of FIG. 1 is shown carrying a scroll plough share 68 at its foot instead of a mole plough so as to plough the ground into furrows in a normal way, the share 68 being held detachably in position at 69. It will be appreciated, however, that owing to the oscillating of the share 68 lifting the soil above its leading end, a lower-powered tractor than is usually required is adequate for effecting the ploughing operation.

What I claim as my invention and desire to secure by Letters Patent of the United States is:

1. Apparatus for reducing the effort required for a tractor to draw an agricultural tool operatively through the ground, comprising a chassis, said chassis adapted to be progressed over the ground, a tool holder, a pivotal support from said chassis for one end of said tool holder, said tool holder being suspended pendulously from said pivotal support, said tool holder adapted at its other end to support said tool, and oscillatory means interconnecting said tool holder and chassis intermediate the pivotal support and said other end of the tool holder to oscillate said tool holder in a plane containing the line of progression of said chassis whereby to tilt the tool during its progression through the ground for creating clearance in the earth above and below the tool thereby reducing the frictional drag on the tool, wherein the improvement comprises said pivotal support for the said one end of said tool holder being mounted on a carriage, guide means pivotally connected to said chassis and extending generally upwards from said chassis, said carriage being slidably adjustable in said guide means, and adjusting means between said guide means and said chassis for adjusting the angular position of said guide means without adjusting the position of the carriage in said guide means.

2. Apparatus according to claim 1 in which the oscillatory means for the tool holder comprises an eccentric having a sheave connected by a connecting rod to the tool holder and means for driving the eccentric.

3. Apparatus according to claim 2 in which the eccentric is driven from a driven shaft through speed-increasing gearing.

4. Apparatus according to claim 3 in which the chassis is adapted to be towed by a tractor, and the driven shaft is driven from the power take-off shaft of the tractor.

5. Apparatus according to claim 1 in which the chassis is in the form of a sledge provided with a pair of coaxial ground-engageable wheels which can be moved about a common pivotal connection to the sledge whereby the wheels can be depressed for raising the sledge clear of the ground.

6. Apparatus for reducing the effort required to draw through the ground apparatus for laying an elongate article of the group including hose, conduit, cable and the like, comprising a chassis, said chassis adapted to be progressed over the ground, a tool holder, a pivotal support from said chassis for one end of said tool holder, said tool holder being suspended pendulously from said pivotal support, said tool holder adapted at its other end to support said tool, and oscillatory means interconnecting said tool holder and chassis intermediate the pivotal support and said other end of the tool holder to oscillate said tool holder in a plane containing the line of progression of said chassis whereby to tilt the tool during its progression through the ground for creating clearance in the earth above and below the tool thereby reducing the frictional drag on the tool, wherein the improvement comprises a storage drum for said elongate article rotatably mounted on said chassis, a fair-lead for said elongate article on said tool holder, said pivotal support for the said one end of said tool holder being mounted on a carriage, guide means pivotally connected to said chassis and extending generally upwards from said chassis, said carriage being slidably adjustable in said guide means, and adjusting means between said guide means and said chassis for adjusting the angular position of said guide means without adjusting the position of the carriage in said guide means.

References Cited

UNITED STATES PATENTS

| 3,211,236 | 10/1965 | Patton | 172—40 |
| 3,371,495 | 3/1968 | Kaercher | 172—40 X |
| 2,190,618 | 2/1940 | Watkins | 172—388 |
| 3,326,010 | 6/1967 | Gagne | 172—40 X |

ROBERT E. PULFREY, Primary Examiner

R. C. HARRINGTON, Assistant Examiner

U.S. Cl. X.R.

37—193; 172—40